(12) United States Patent
Nix et al.

(10) Patent No.: US 9,455,965 B2
(45) Date of Patent: Sep. 27, 2016

(54) SECURE AND RAPID NETWORKING CONFIGURATION OF INFORMATION HANDLING SYSTEMS AND PERIPHERALS

(75) Inventors: William Nix, Austin, TX (US); Carlton Andrews, Austin, TX (US); Gary D. Huber, Austin, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1892 days.

(21) Appl. No.: 12/559,717

(22) Filed: Sep. 15, 2009

(65) Prior Publication Data

US 2011/0063994 A1    Mar. 17, 2011

(51) Int. Cl.
  H04W 4/00    (2009.01)
  H04B 5/00    (2006.01)
  H04L 29/06   (2006.01)

(52) U.S. Cl.
  CPC ............ *H04L 63/06* (2013.01); *H04B 5/0037* (2013.01); *H04B 5/0062* (2013.01); *H04L 63/10* (2013.01)

(58) Field of Classification Search
  None
  See application file for complete search history.

(56) References Cited

U.S. PATENT DOCUMENTS

| | | | |
|---|---|---|---|
| 7,230,520 B2 | 6/2007 | Zaretsky et al. | |
| 2006/0239236 A1* | 10/2006 | Otsuka | 370/338 |
| 2007/0054616 A1 | 3/2007 | Culbert | |
| 2007/0075139 A1* | 4/2007 | Hammond et al. | 235/435 |
| 2007/0132733 A1* | 6/2007 | Ram | 345/163 |
| 2007/0229225 A1 | 10/2007 | Zaretsky et al. | |
| 2008/0176515 A1* | 7/2008 | Hiles | 455/41.2 |
| 2008/0238676 A1* | 10/2008 | Dhillon et al. | 340/572.1 |
| 2009/0264098 A1 | 10/2009 | Lo et al. | |
| 2010/0027441 A1 | 2/2010 | Curtis et al. | |
| 2010/0068997 A1* | 3/2010 | Dunko | 455/41.1 |
| 2011/0197063 A1* | 8/2011 | Iwamura | 713/168 |
| 2011/0250841 A1* | 10/2011 | Hulvey | 455/41.1 |

* cited by examiner

*Primary Examiner* — Duc Duong
(74) *Attorney, Agent, or Firm* — Terrile, Cannatti, Chambers & Holland, LLP; Robert W. Holland

(57) ABSTRACT

A near field communication device, such as an RFID wand, transmits network configuration information to non-volatile memory of a networking device while the networking device is powered down, and even packaged at a retail store. The networking device powers up, reads the network configuration information, and applies the network configuration to automatically interface the networking device with a wireless network.

20 Claims, 4 Drawing Sheets

SECURE AND RAPID NETWORKING CONFIGURATION OF INFORMATION HANDLING SYSTEMS AND PERIPHERALS

BACKGROUND OF THE INVENTION

1. Field of the Invention

The present invention relates in general to the field of information handling system networking, and more particularly to a system and method for secure and rapid networking configuration of information handling systems and peripherals.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system use has grown over the past several years at least in part because of the convenience provided by networking. A prime example of a network that has spurred information handling system growth is the Internet. As information handling systems proliferate, enterprises and end users have an increasing number of innovative uses for the Internet that have integrated network access into the very fabric of daily life. Some examples, include e-mail and messaging, which have changed the way we communicate, bank and brokerage account access, which have changed the way we finance, and blogs, which have changed the way we debate. Although the Internet has brought about many such innovations, the innovations would have only marginal value without ready access to the Internet by end users. Initially, Internet access to end users was limited to hard-wired interfaces. Enterprises provided access through a centralized server and switch architecture that interfaced with offices through Ethernet cables. Non-commercial or home-based Internet interfaces were supported through dial-in, DSL, cable or other modems that input directly into an information handling system, such as through an Ethernet card or modem card built into the information handling system. In some instances, end users hard-wired their homes with Cat 5 cable to support a home network that allowed access in multiple locations through the house.

More recently, wireless networking capabilities available to enterprises and end users have made network access much more convenient than conventional hard-wired network access. Industry standards, such as IEEE 802.11 standards, have encouraged wide spread use of wireless local area and personal area networks. By setting up a home wireless local area network (WLAN) compliant with 802.11(b), (g) or (n), an end user can effectively access the Internet through the WLAN from any point within the range of the WLAN transceiver. One problem with wireless networking is that the radio signals of the wireless network are available to all receivers within the range of the wireless networking transceiver. To prevent unauthorized access, wireless networking components typically include security features, such as a WEP or WPA key that prevents access from unauthorized devices that do not have the proper security code. Unfortunately, setting up and maintaining a wireless network often presents an overwhelming challenge to end users. Even where an end user manages to interface information handling systems and peripherals through a wireless network, the end user often leaves the network unsecured due to the difficulty of setting up the network in a secure manner with all devices re-associated with the network. These difficulties reappear each time the end user adjusts the network, such as by adding or replacing information handling systems or peripherals. Often, peripherals made by different manufacturers are programmed in different manners so that learning wireless network setup is a very real challenge for the home or business end user. Since the peripherals typically originate with a variety of manufacturers, pre-loading a peripheral with an intended network's configuration information has not been a practicable solution, especially where the peripherals are purchased from other than the peripheral manufacture, such as a retail store or as part of package from an information handling system manufacturer.

SUMMARY OF THE INVENTION

Therefore a need has arisen for a system and method which configures a wireless networking component with configuration information for an intended network without powering up the networking component.

In accordance with the present invention, a system and method are provided which substantially reduce the disadvantages and problems associated with previous methods and systems for configuring a networking component for an intended wireless network. Networking configuration information for the intended network is transmitted to a networking device with a near field communications device and stored in non-volatile memory of the networking device to be utilized when power is applied to the networking device. Upon power up, the networking configuration information is retrieved from the non-volatile memory and applied to a networking component of the networking device to support communication with the intended network.

More specifically, an RFID wand transmits network configuration information for a selected network to an RFID device integrated in a networking device. The communication of network configuration information may occur with the networking device in a powered down state and enclosed by a package. The RFID device stores the network configuration information in non-volatile memory. Upon power up of the network device, a network configuration module running on the networking device retrieves the network configuration information and applies the networking configuration information to a network component so that the network component supports communication with the selected network. For example, wireless network SSID, WEP or WPA configuration information is transmitted to an RFID device integrated in an information handling system or printer having a WLAN interface to be later applied to the network interface to support communication over the WLAN. The wireless network configuration information is defined upon purchase of the networking devices or retrieved from previous programming of networking devices, such as a centralized database or from an existing network.

The present invention provides a number of important technical advantages. One example of an important technical advantage is that a wireless networking component is configured for an intended network without applying power to the wireless component. For example, a peripheral, such as a printer with a wireless network interface, is programmed to interact with an end user's wireless network while powered down and still packaged. A retail store can perform the programming with an RFID wand that inputs the network configuration information to a ROM through product packaging while a customer waits for the product. An information handling system manufacturer can send a complete network setup and ready to go from the box by programming each networking component using an RFID wand through the component packaging before the component is shipped to the end user purchaser. Once a selected network's configuration information is stored with a manufacturer or retail seller, any subsequent purchases for that network can be automatically loaded with the network configuration information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Loading network configuration information to a networking device with a near field communications device simplifies deployment of the networking device to a selected network. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
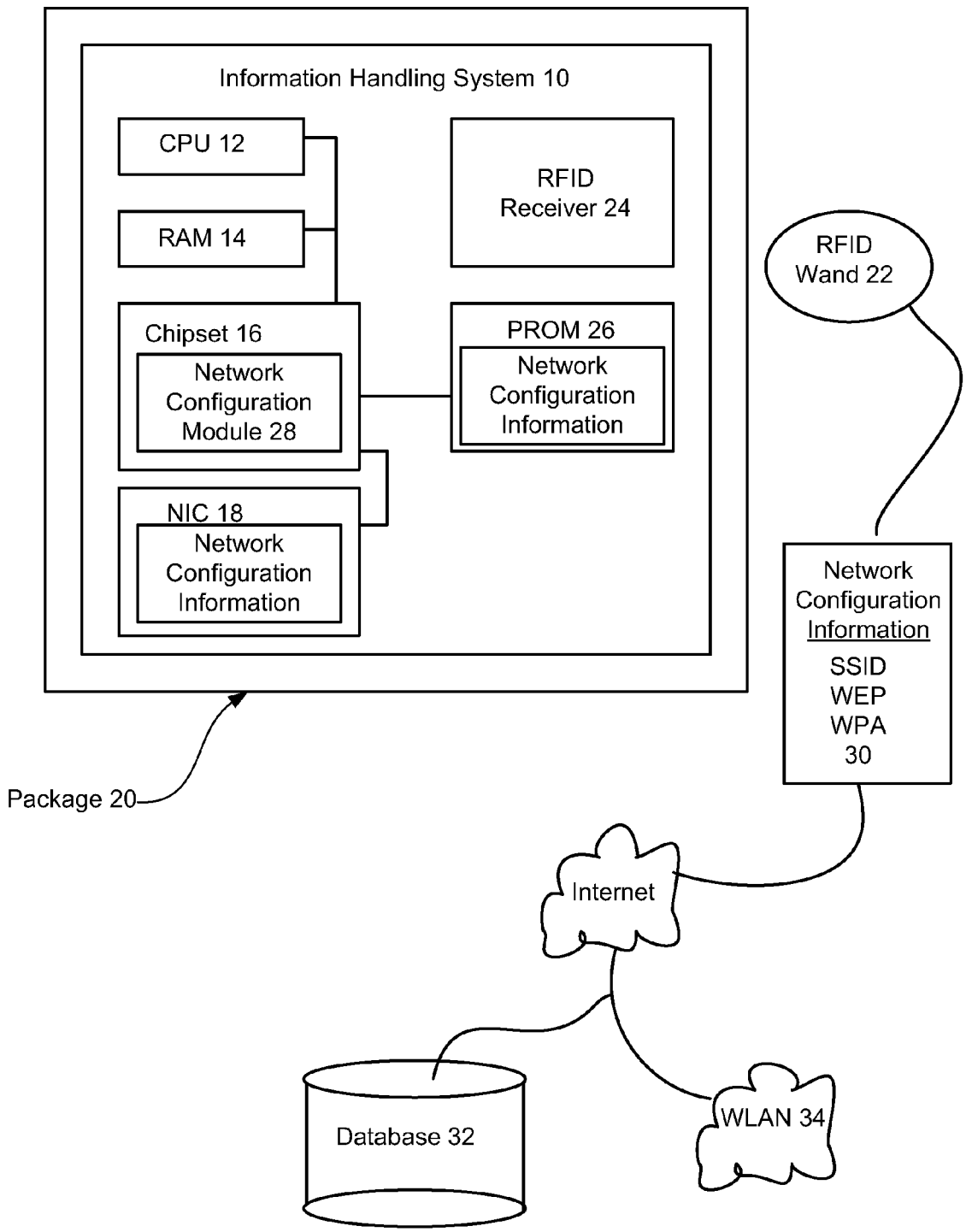
FIG. 1 depicts a block diagram of a networking device having a networking component configured with network configuration information load to a non-volatile memory with a near field communications device.

Referring now to FIG. 1, a block diagram depicts a networking device having a networking component configured with network configuration information loaded to a non-volatile memory with a near field communications device. The example networking device is an information handling system 10 built from plural processing components that cooperate to process information, such as processor 12, RAM 14 and a chipset 16. In alternative embodiments, the networking device is any device that communicates through a network, such as a router, a switch, an access point, a printer, or other types of peripheral devices. The networking component on information handling system 10 that supports communication with a network is a network interface card (NIC) 18, such as a wireless NIC that complies with IEEE 802.11(b, g or n). NIC 18 communicates with a WLAN by using network configuration information associated with the WLAN, such as an SSID and a security key, such as a WEP or WPA. In the example embodiment of FIG. 1, information handling system 10 is enclosed in a package 20, such as with packaging performed by a manufacturer to protect the system during shipping so that information handling system is powered down and physically inaccessible unless the package is removed.

In order to program NIC 18 or other networking components while information handling system 10 is powered down and packaged, a near field communications device transmits network configuration information to information handling system 10 through package 20. In the example embodiment of FIG. 1, the near field communications device is an RFID wand 22, which transmits network configuration information to an RFID receiver 24 integrated in information handling system 10. RFID receiver 24 writes the network configuration information to a non-volatile memory, such as PROM 26, so that the network configuration information is stored on information handling system 10 without applying power to or removing packaging from information handling system 10. Upon power up of information handling system 10, a network configuration module 28, such as firmware instructions running on a processor within chipset 16, reads the network configuration information from PROM 26 and applies the network configuration information to NIC 18 so that NIC 18 can interact with the selected wireless network automatically. RFID wand 22 obtains the network configuration information from a variety of locations, such as local storage device 30, a centralized storage device 32 or from a selected network location 34. Local storage device 30 has network configuration information input by a technician who, for example, assigns the network configuration information to the system. Centralized database 32 stores network configuration information for plural networks, such as with information obtained during previous networking device configurations, and allows access to a technician with a code name and password protection scheme. The selected network location is, for example, the network in which networking device 10 is intended to operate. Direct communication of RFID wand to network 34 ensures that network information consistent with network 34 will be programmed in networking device 10.

Figure 2:
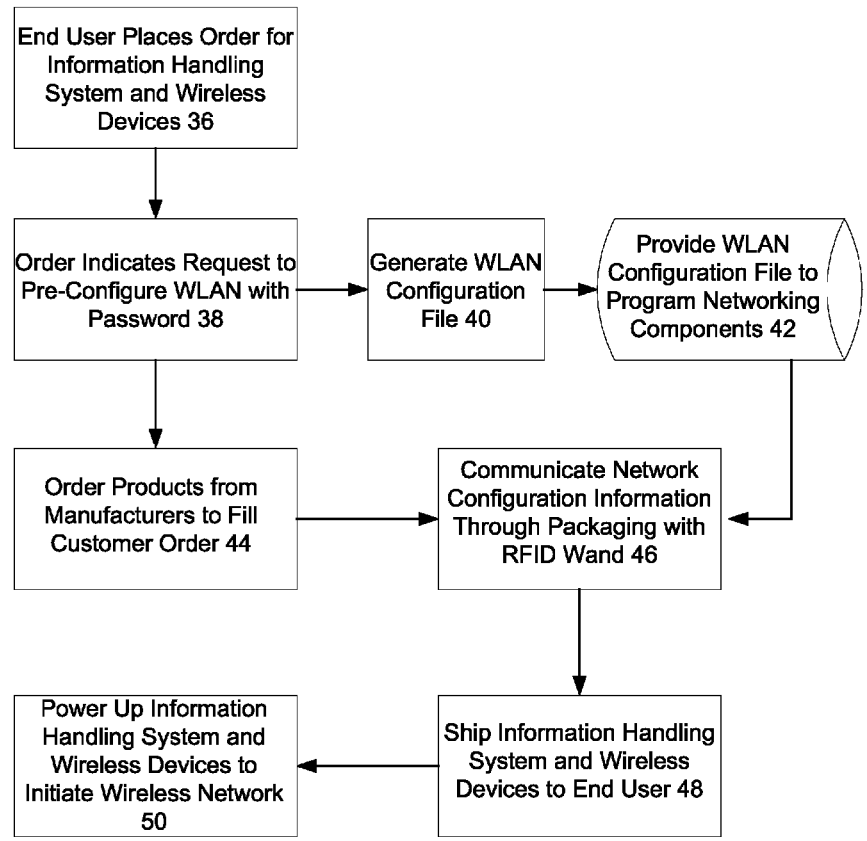
FIG. 2 depicts a flow diagram of a process for programming a networking device with networking configuration information using near field communications at a point of sale.

Referring now to FIG. 2, a flow diagram depicts a process for programming a networking device with networking configuration information using near field communications at a point of sale. The process begins at step 36 with placement of an order for an information handling system and networking devices, such as from an information handling system manufacturer through the Internet. At step 38, the end user indicates a desire to preconfigure the information handling system and networking components to cooperate through a wireless network, such as by inputting a password that the end user designates to protect access to the network. At step 40, a WLAN configuration file is generated from the end user request, such as SSID, WEP or WPA information, and, at step 42, the WLAN configuration file is stored in a centralized database accessible at manufacture. In one embodiment, the centralized database remains available at future date to configure subsequent purchases of networking devices by the end user for the newly created network. At step 44, orders are placed with networking device manufacturers for delivery of the networking devices to the information handling system manufacturer. At step 46, the information handling system and networking components are programmed with the network configuration file with an RFID wand. Programming of the networking devices is accomplished through product packaging and with the networking devices powered down. At step 48, the information handling system and networking products are shipped to the end user and powered up so that, upon application of power at step 49, the networking devices automatically configure to communicate through the wireless network designed by the end user in the initial product order.

Figure 3:
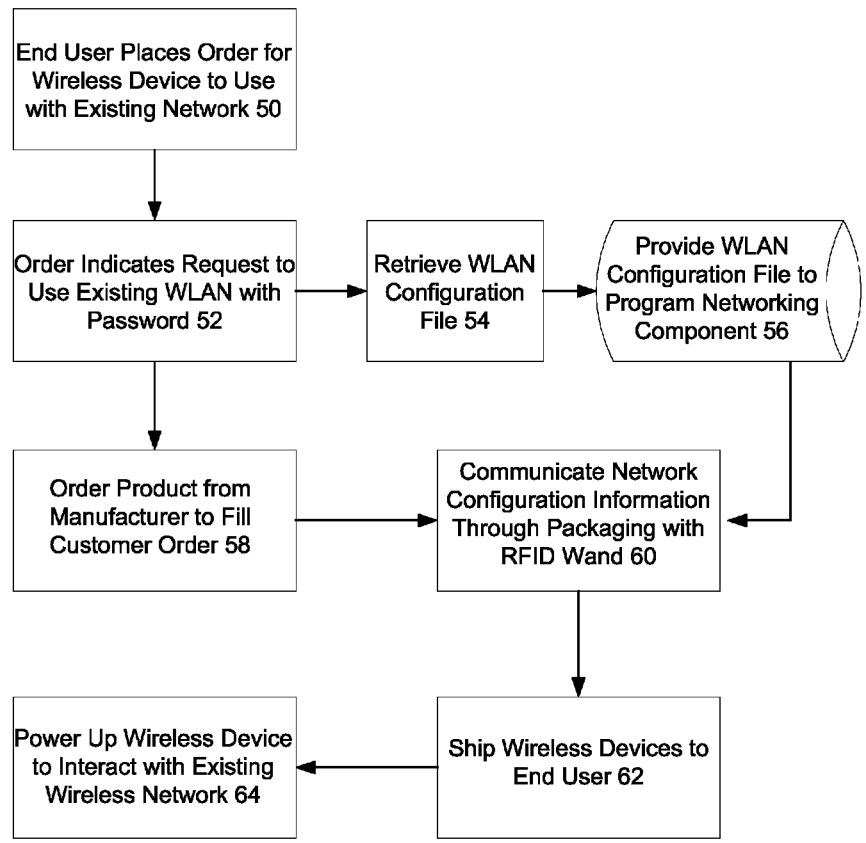
FIG. 3 depicts a flow diagram of a process for programming a networking device with networking configuration information using near field communications after an initial point of sale.

Referring now to FIG. 3, a flow diagram depicts a process for programming a networking device with networking configuration information using near field communications after an initial point of sale. The process begins at step 50 with an order by an end user of a networking device for an existing wireless network, such as a printer, switch, router or information handling system peripheral that communicates over a WLAN. At step 52, the end user indicates that the ordered networking device will associate with an existing wireless network. At step 54, the network configuration file for the selected wireless network is retrieved and, at step 56, the network configuration file is made available to programming of networking devices purchased by the end user. At step 58, the networking device is ordered from its manufacturer and, at step 60, the networking device is programmed with the network configuration file selected by the end user by transmitting the network configuration information with a near field communication device, such as an RFID wand. At step 62, the networking device is shipped to the end user so that, at step 64, powering up the networking device automatically interfaces the networking device with the wireless network selected by the end user at the ordering of the networking device.

Figure 4:
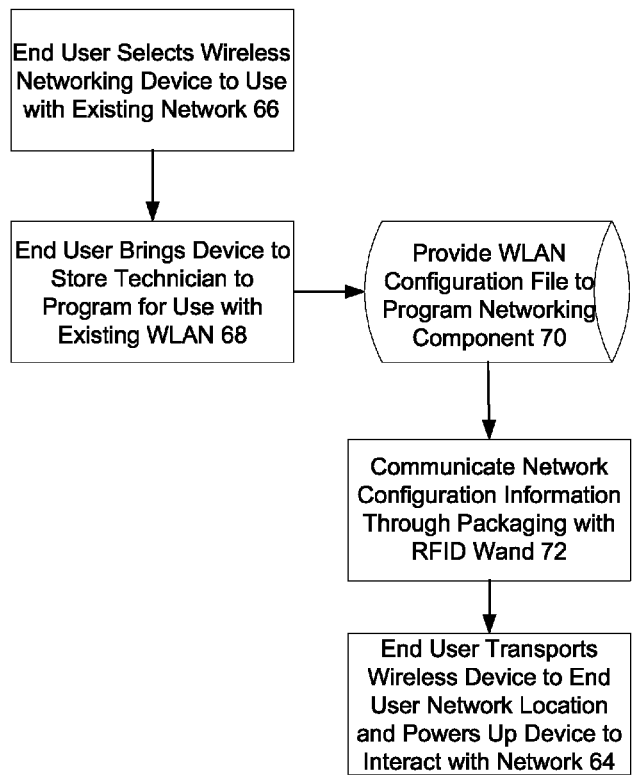
FIG. 4 depicts a flow diagram of a process for programming a networking device with networking configuration information using near field communications at a retail location.

Referring now to FIG. 4, a flow diagram depicts a process for programming a networking device with networking configuration information using near field communications at a retail location. The process begins at step 66 with selection by an end user of a networking device at a retail store. At step 68, the end user identifies a network with which the end user intends to associate the networking device. At step 70, the retail store technician retrieves network configuration information associated with the selected end user network and transmits the network configuration information to the networking device with a near field communications device, such as by transmitting the information through product packaging with an RFID device. The network configuration information may be provided by the end user, downloaded from a centralized database or retrieved from the selected network itself. At step 72, the end user brings the purchased networking device from the retail location to the network location. At step 74, the networking device is powered up to automatically configure with the networking configuration information so that communications with the network is automatically initiated, such as by use of an SSID, WEP or WPA associated with the network.

Although the present invention has been described in detail, it should be understood that various changes, substitutions and alterations can be made hereto without departing from the spirit and scope of the invention as defined by the appended claims.

What is claimed is:

1. A networking device comprising:
    a networking component operable to support wireless networking;
    non-volatile memory interfaced with the networking component and operable to store information in a powered down state;
    a near field communications device interfaced with the non-volatile memory and operable to receive near field communications from a near field transmitter and to store network configuration information from the near field communications on the non-volatile memory with the networking component in a powered down state; and
    a network configuration module interfaced with the non-volatile memory and operable upon power up of the networking component to program the networking component with the network configuration information stored on the non-volatile memory.

2. The networking device of claim 1 wherein the near field communications device comprises an RFID receiver.

3. The networking device of claim 1 wherein the non-volatile memory comprises a PROM.

4. The networking device of claim 1 wherein the networking component comprises a wireless network interface card.

5. The networking device of claim 1 wherein the networking component comprises a wireless access device.

6. The networking device of claim 1 wherein the network configuration information comprises an SSID.

7. The networking device of claim 1 wherein the network configuration information comprises a security key.

8. The networking device of claim 1 wherein the network configuration module comprises firmware executing on a processor.

9. The networking device of claim 1 wherein the network configuration module is further operable to restore the network configuration information to the networking component if the network configuration information used by the network component changes.

10. A method for configuring a networking device, the method comprising:
    associating a networking device with a network having network configuration information;
    communicating the network configuration information to the networking device by transmitting the network configuration information with a near field communication device;

receiving the network configuration information at the networking device with a near field communication device while the networking device is in a powered down state; and writing the network configuration information to non-volatile memory of the networking device.

11. The method of claim 10 wherein writing the network configuration information further comprises writing the network configuration information to a PROM.

12. The method of claim 10 further comprising:
powering up the networking device; and
automatically retrieving, in response to the powering up, the network configuration information from the non-volatile memory and applying the network configuration information to communicate through a network with the networking device.

13. The method of claim 12 wherein applying the network configuration information to communicate further comprises communicating with the networking device through a wireless local area network.

14. The method of claim 10 wherein the networking device comprises a printer having a wireless network interface card and the network configuration information comprises an SSID.

15. The method of claim 10 further comprising retrieving network configuration information for the network to write to the networking device by communicating with the network through the Internet.

16. The method of claim 10 further comprising retrieving network configuration information for the network to write to the networking device by communicating with a centralized storage location through the Internet.

17. A method for configuring a wireless networking device to communicate through a wireless network having network configuration information, the method comprising:
communicating the network configuration information to non-volatile memory of the networking device with a near field communication device while the networking device is powered down;
powering up the networking device;
automatically in response to the powering up retrieving the network configuration information to apply to the networking device; and
communicating with the networking device through the wireless network using the configuration information.

18. The method of claim 17 wherein the near field communication device comprises an RFID wand.

19. The method of claim 17 wherein communicating the network configuration information further comprise communicating with the RFID wand through packaging that contains the networking device.

20. The method of claim 17 wherein the networking device comprises a router.

\* \* \* \* \*